United States Patent
Okamura

(10) Patent No.: US 7,567,366 B2
(45) Date of Patent: Jul. 28, 2009

(54) IMAGE SCANNER PROVIDED WITH POWER SAVING MODE AND A SYSTEM HAVING A POWER SAVING MODE

(75) Inventor: Yukio Okamura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1019 days.

(21) Appl. No.: 10/855,957

(22) Filed: May 28, 2004

(65) Prior Publication Data

US 2005/0052680 A1 Mar. 10, 2005

(30) Foreign Application Priority Data

May 29, 2003 (JP) .................... P. 2003-152767
May 29, 2003 (JP) .................... P. 2003-152986

(51) Int. Cl.
*H04N 1/04* (2006.01)

(52) U.S. Cl. ............... 358/474; 358/475; 358/509; 310/316; 395/113; 348/294; 372/38.1

(58) Field of Classification Search ......... 358/501, 358/474, 505, 1.15, 1.14, 442, 402, 403, 358/475, 509; 399/13, 119, 21; 310/316, 310/354; 395/113, 500.41; 348/294; 372/38.1
See application file for complete search history.

(56) References Cited

U.S. PATENT DOCUMENTS 4,745,436 A * 5/1988 Matsuura ............... 399/70
4,992,884 A * 2/1991 Sakata ................... 358/401
5,731,652 A * 3/1998 Shimada ............. 310/316.01
5,758,040 A * 5/1998 Ichimura et al. ......... 358/1.14
5,900,950 A * 5/1999 Hsu ....................... 358/497
6,081,663 A * 6/2000 Takahashi et al. .......... 703/20
6,316,767 B1   11/2001 Paxton et al.
6,882,822 B2 * 4/2005 Gomi et al. ............. 399/380
6,883,016 B1 * 4/2005 Fujii et al. .............. 709/203
6,961,136 B2 * 11/2005 Ogura et al. ............ 358/1.14
7,423,770 B2 * 9/2008 Ogura et al. ............ 358/1.14
2002/0140963 A1 * 10/2002 Otsuka ................... 358/1.14

FOREIGN PATENT DOCUMENTS

| JP | 63-023460 A | 1/1988 |
| JP | 01-284886 A | 11/1989 |
| JP | 06-309449 A | 11/1994 |
| JP | 08-242322 A | 9/1996 |

* cited by examiner

*Primary Examiner*—Negussie Worku
(74) *Attorney, Agent, or Firm*—Sughrue Mion, PLLC

(57) ABSTRACT

A system having a power saving mode includes: a body provided with an original table having a surface for putting an original; an original cover coupled to the original table so that the original cover can be opened and closed to cover at least the surface of the original table; a light source that emits a beam; a power source that supplies power to the light source; a cover opening/closing detector that detects that the original cover is opened/closed; and a power source controller that controls the power source so that the power saving mode is released when the cover opening/closing detector detects that the original cover is closed during the power saving mode.

10 Claims, 15 Drawing Sheets

IMAGE SCANNER PROVIDED WITH POWER SAVING MODE AND A SYSTEM HAVING A POWER SAVING MODE

BACKGROUND OF THE INVENTION

The present invention relates to an image scanner provided with a power saving mode, for example, a simplex image scanner used as a peripheral device of a personal computer and a printer provided with an image scanner.

An image scanner which has a body provided with an original table having a surface such as a glass table for putting an original and which scans images of the original put on the surface of the original table is already known. This type of image scanner is provided with an original cover which can be opened and closed for pressing the original table, a fluorescent lamp as a light source and a charge-coupled device (CCD) that senses reflected light on the original of a beam emitted from the fluorescent lamp and converts it to an electric signal for example. Further, this type of image scanners have a power saving mode for suppressing the power consumption of the whole device (refer to a patent document 1). These image scanners stop the supply of power to the light source in case the power saving mode is turned on and start the supply of power to the light source again in case the power saving mode is released (see FIGS. 1A and 1B of the patent document 1).

As described above, some image scanners having the power saving mode release the power saving mode when a user presses a predetermined button (in case the image scanner is a copying machine, the button is equivalent to a copying execution button) in the power saving mode. However, in order to reduce total time for reading more, one of conventional type image scanners monitor an output signal value from CCD, senses that the original cover is opened in case the output signal value increases and starts the supply of power to the light source (refer to a paragraph 40 of the patent document 1). Besides, the conventional type image scanners stop the supply of power to the light source when fixed time elapses after reading operation is finished (refer to paragraphs 66 and 67 of the patent document 1).

Patent Document 1
  JP-A-6-309449

According to the conventional type image scanner, it is detected that the original cover is lifted, in other words, a sign that the image scanner may be used by a user (hereinafter called a sign of use by a user) is detected. However, the sign of use by the user other than the original cover is lifted may be considered. If such another sign of use by a user can be detected and the power saving mode can be released, the total reading time of the image scanner can be more reduced.

SUMMARY OF THE INVENTION

Therefore, the object of the invention is to enable also detecting a sign of use by a user except that an original cover is lifted.

In order to solve the aforesaid object, the invention is characterized by having the following arrangement.

(1) A system having a power saving mode comprising:
  a body provided with an original table having a surface for putting an original;
  an original cover coupled to the original table so that the original cover can be opened and closed to cover at least the surface of the original table;
  a light source that emits a beam;
  a power source that supplies power to the light source;
  a cover opening/closing detector that detects that the original cover is opened/closed; and
  a power source controller that controls the power source so that the power saving mode is released when the cover opening/closing detector detects that the original cover is closed during the power saving mode.

(2) The system according to (1), wherein the power source controller releases the power saving mode when the cover opening/closing detector detects that the original cover is opened detector during the power saving mode.

(3) The system according to (1), wherein the power source controller releases the power saving mode when the cover opening/closing detector detects that the original cover is opened during the power saving mode, turns a power mode to the power saving mode when a predetermined event including that the original cover has been closed is not detected for a predetermined time, and releases the power saving mode when the cover opening/closing detector detects that the original cover is closed during the power saving mode.

(4) The system according to (1), wherein in the power saving mode, the power source controller stops the supply of power to the light source or reduces power supplied to the light source than that in a normal mode.

(5) The system according to (1), wherein the light source is at least one of a fluorescent lamp, a xenon lamp and a light emitting diode.

(6) The system according to (1), further comprising an image output device that outputs read image data of an original.

(7) The system according to (6), wherein
  the image output device is provided with a normal power mode and a power saving mode,
  power is supplied to the image output device from the power source, and
  when the cover opening/closing detector is at least detected that the original cover is closed, the power source controller releases the power saving mode if the image output device is in the power saving mode.

(8) The system according to (6), wherein the read image output device includes at least one of following (1) to (4):
  (1) an image data transmitter that transmits read image data to a device connected to the system so that communication is possible;
  (2) a facsimile transmitter that transmits read image data to a predetermined or user-desired destination terminal via a public telephone network by a facsimile signal;
  (3) a data storage that stores read image data in an external storage connected to the system so that the external storage can be detached; and
  (4) a printer that prints read image data on a predetermined print medium.

(9) The system according to (1), wherein the cover opening/closing detector includes an external light-sensitive unit for detecting external light and detects that the original cover is opened and closed based on an intensity of light which varies as the original cover is opened and closed.

(10) The system according to (1), wherein the cover opening/closing detector includes a mechanical detecting member for detecting that the original cover is opened and closed.

(11) A method of controlling a power source of a system having a power saving mode, the system comprising a body having an original table having a surface for putting an original, an original cover coupled to the original table so that the original cover can be opened and closed to cover at least the surface of the original table, a light source that emits a beam and the power source that supplies power to the light source, the power source control method comprising the steps of:
sensing that the original cover is closed; and
controlling the power source so that the power saving mode is released if the power saving mode is turned on when it is sensed that the original cover is closed.

(12) A system having a power saving mode comprising:
a body provided with an original table having a surface for putting an original;
an original cover coupled to the original table so that the original cover can be opened and closed to cover at least the surface of the original table;
a light source that emits a beam;
a power source that supplies power to the light source;
an external light detector that detects external light incident on the body via the surface and outputs a detection signal; and
a power source controller that judges whether the intensity of the external light decreases or not based upon the detection signal and controls the power source so that the power saving mode is released when it is judged that the intensity of the external light decreases in the power saving mode.

(13) The system according to (12), wherein the power source controller judges both whether the intensity of external light increases or not and whether the intensity decreases or not based upon the detection signal and releases the power saving mode when it is judged at least either of that the intensity of the external light increases or that the intensity of the external light decreases respectively in the power saving mode.

(14) The system according to (12) further comprising an image output device that outputs read image data of an original.

(15) The system according to (12), wherein in case judgment is made so that external light is unchanged even if predetermined time elapses after the power saving mode is released based upon a detection signal, the power saving mode is turned on.

(16) A method of controlling a power source of a system having a power saving mode, the system comprising a body having an original table having a surface for putting an original, an original cover coupled to the original table so that the original cover can be opened and closed to cover at least the surface of the original table, a light source and the power source that supplies power to the light source, the method comprising the steps of:
detecting external light incident inside the body via the surface and outputting a detection signal; and
judging whether the intensity of the external light decreases or not based upon the detection signal and controlling the power source so that the power saving mode is released when it is judged that the intensity of the external light decreases in the power saving mode.

DETAILED DESCRIPTION OF THE PREFERRED EMBODIMENTS

Figure 1:
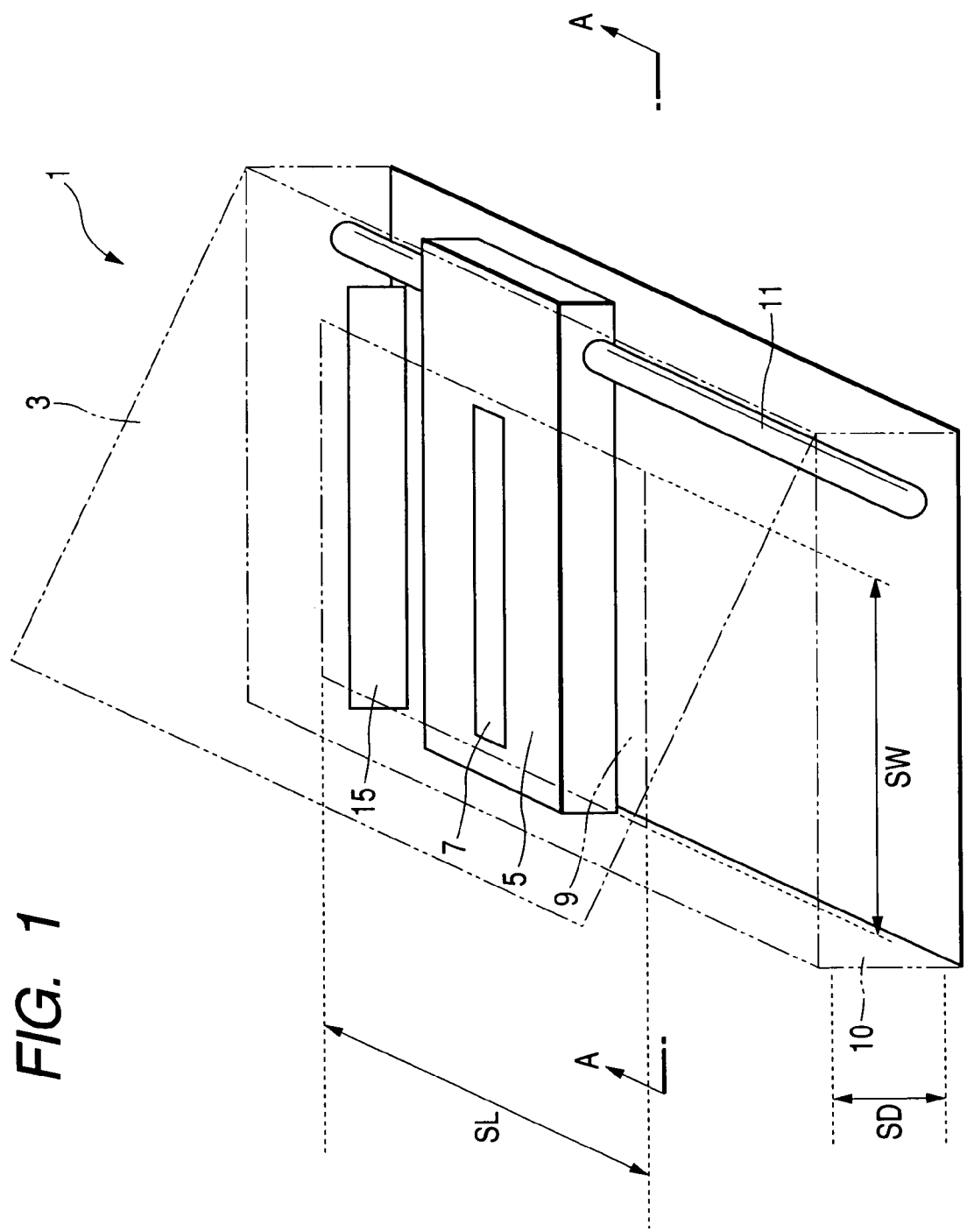
FIG. 1 is a perspective view showing an image scanner according to one embodiment of the invention.

Referring to the drawings, embodiments of the invention will be described below.

Figure 2:
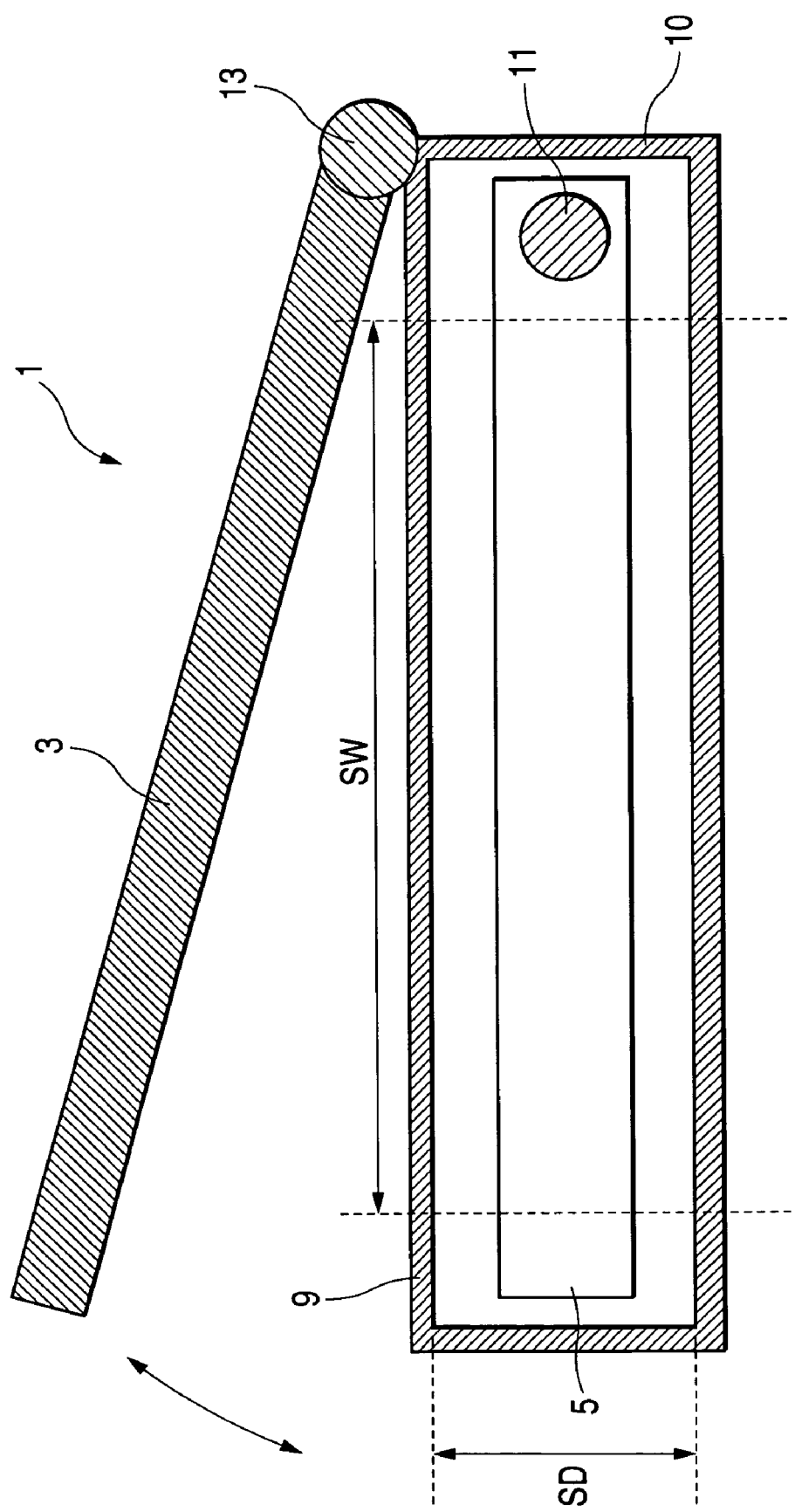
FIG. 2 is a sectional view viewed along a line A-A in FIG. 1.
Figure 3:
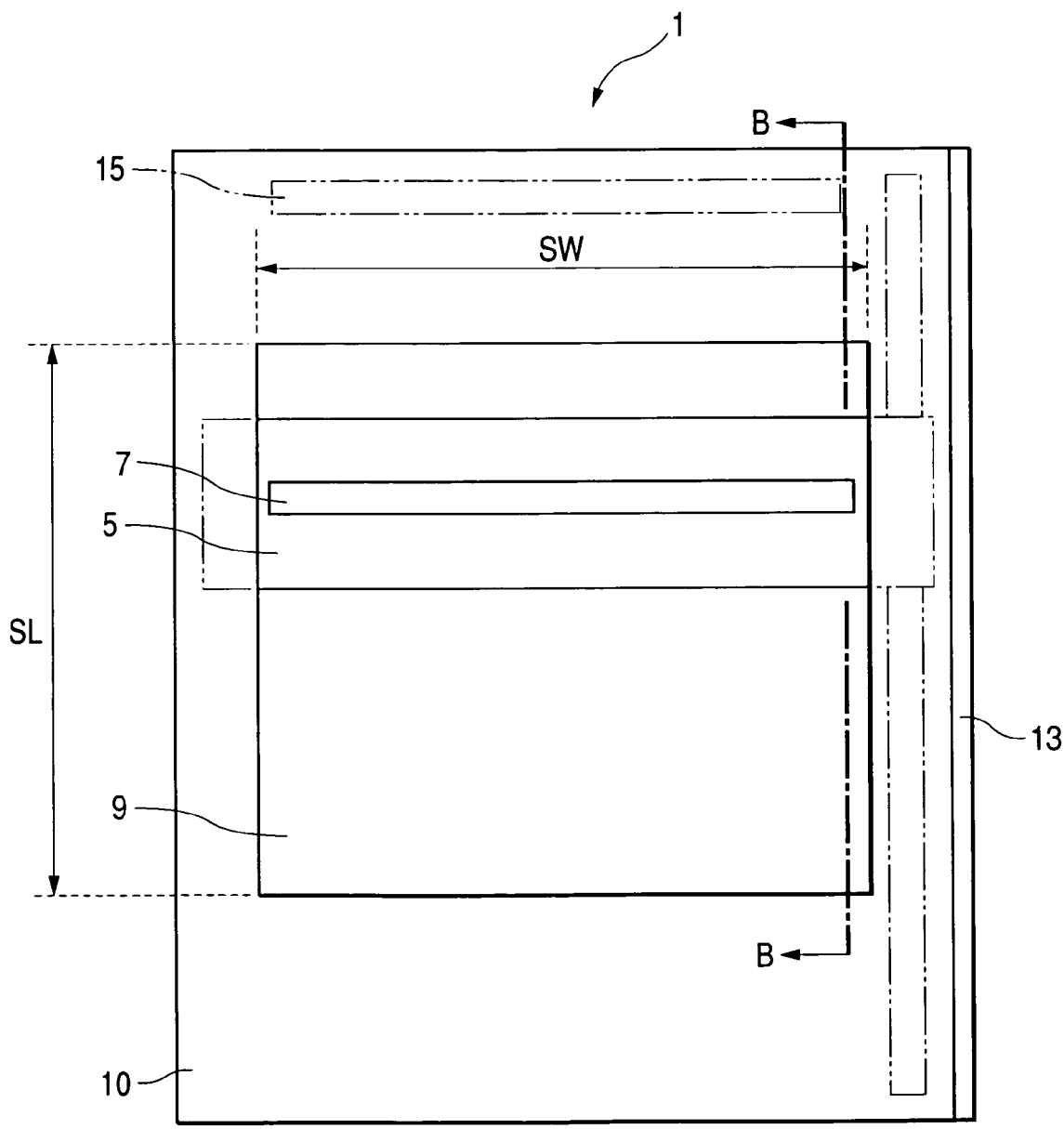
FIG. 3 is a top view showing the image scanner according to this embodiment.
Figure 4:
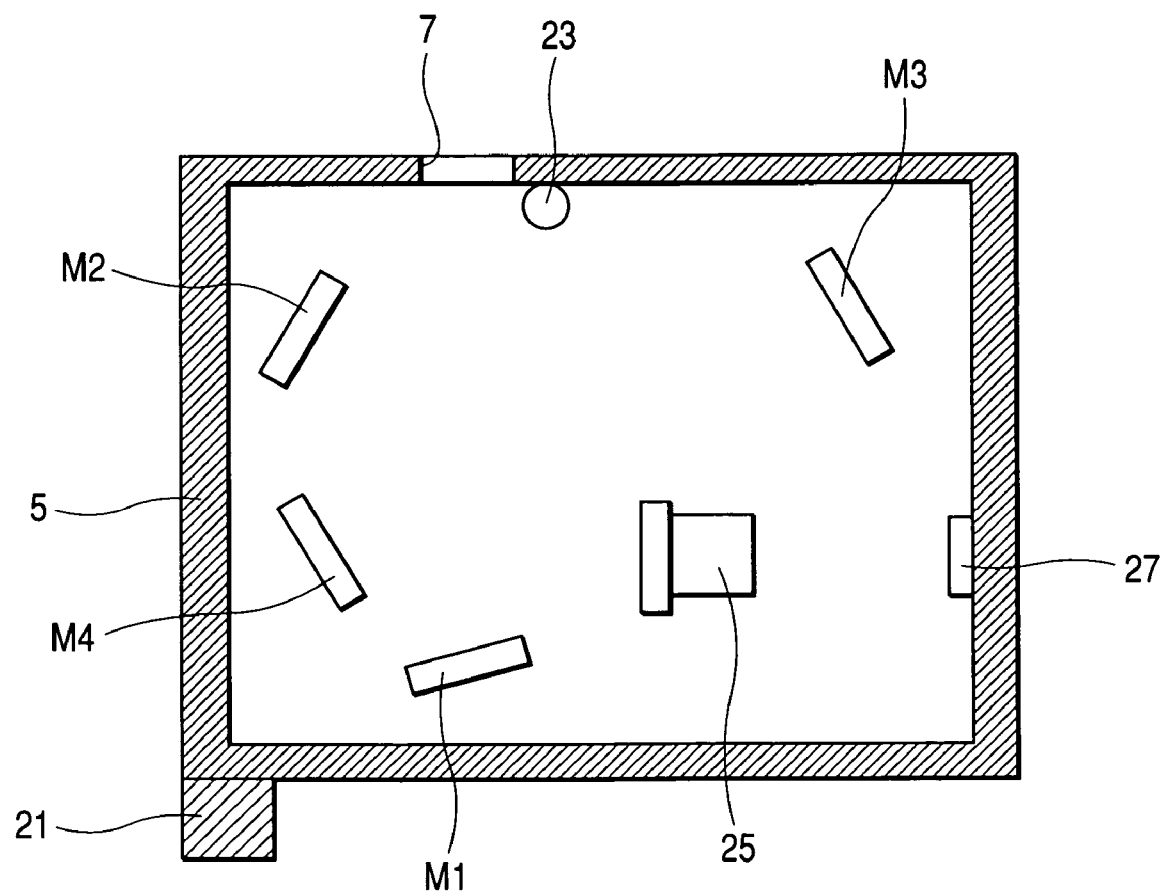
FIG. 4 is a sectional view viewed along a line B-B in FIG. 3 and shows the internal structure of a reading head in the image scanner.

FIG. 1 is a perspective view showing an image scanner according to an embodiment of the invention, FIG. 2 is a sectional view along a line A-A in FIG. 1, FIG. 3 is a top view showing the image scanner according to the embodiment, FIG. 4 is a sectional view along a line B-B in FIG. 3 and shows the internal structure of a reading head in the image scanner.

The image scanner 1 according to this embodiment is a flat-bed scanner provided with the reading head 5 which is a shrinking optical system and has a normal power mode in which power required to reading is consumed and a power saving mode in which power consumption is suppressed. The image scanner 1 is provided with the body 10 having an original table for putting an original to be read, an original cover 3 attached to the original table of the body 10 so that the original cover can be opened and closed and a rotating shaft 13 (not shown in FIG. 1) for coupling the body 10 to the original cover 3. In FIG. 1, to illustrate a state of the inside of the scanner 1 clear, the outside surface of the body 10 and the original cover 3 are expressed by an chain double-dashed line.

The body 10 is a solid (for example, a rectangular solid) at least having a surface 9 on which an original is put and internal space. The reading head 5 mounting linear CCD, a CCD substrate 15 for processing an output signal from the linear CCD of the reading head 5, a shaft 11 for guiding the reading head 5, a head driving mechanism not shown (for example, a motor, a belt operated by driving the motor for moving the reading head 5 and others) for reciprocating the reading head 5 along the shaft 11 and a control circuit described later are provided in the internal space.

The surface 9 is a table made of material having high transparent in which light can be sufficiently transmitted, for example glass. A positioning guide 20 (for example, an arrow for indicating to put the corner of an original at the left upper corner of the surface 9) for guiding a position of the surface 9 where part of an original should be put (that is, a positioning point) is located on the surface 9 or in a peripheral predetermined position on the surface (for example, the vicinity of the left upper corner of the surface 9). A location indicated by the positioning guide 20 is an origin of a read image of the original.

The reading head 5 is a solid (for example, a rectangular solid) having a face (hereinafter called a reading face) opposed to the surface 9 of the body 10 and internal space and through which the shaft 11 passes. The reading head 5 is reciprocated in a predetermined direction along the shaft 11, and a rib (hereinafter called a HP detecting rib) 21 for detecting a home position, which is an origin of the reading head 5, on its reciprocated route is provided in a predetermined location of the reading head 5 (for example, on the surface of a lower side). The HP detecting rib 21 touches a predetermined location of the body 10 when the reading head 5 reaches the home position. It can be recognized by detecting it that the reading head 5 reaches the home position in the image scanner 1.

The reading head 5 is provided with a slit 7 on the reading face (see FIGS. 1, 3 and 4) and is provided with a light source 23, mirrors M1 to M4, a lens 25 and linear CCD 27 in the internal space (see FIG. 4).

The slit 7 on the reading face is formed through the reading head 5 from the outside to the inside and thereby, light can be incident on the inside from the outside of the reading head 5. For example, when the light source 23 emits a beam while an original is put on the surface 9 of the body 10 and the original cover 3 is closed, the original reflects the beam from the light source 23 and the reflected light is incident on the inside via the slit 7.

The light source 23 emits a beam by the power supply from a predetermined power source. Concretely, for the light source 23, at least one of a fluorescent lamp such as a cold-cathode fluorescent lamp and a hot-cathode fluorescent lamp, a xenon lamp and a light emitting diode can be adopted.

Each mirror M1 to M4 is arranged at an angle at which light incident via the slit 7 (for example, reflected light on an original from the light source 23) is exactly guided to the lens 25 and the linear CCD 27 can receive the light (for example, an optical image on one line of the original) via the lens 25. Reflected light on the original from the light source 23 which is incident on the inside via the slit 7 reaches the mirror M1, the mirror M2, the mirror M3 and the mirror M4 in the order and is reflected on the mirror M4 and reaches the linear CCD 27 via the lens 25.

Figure 5:
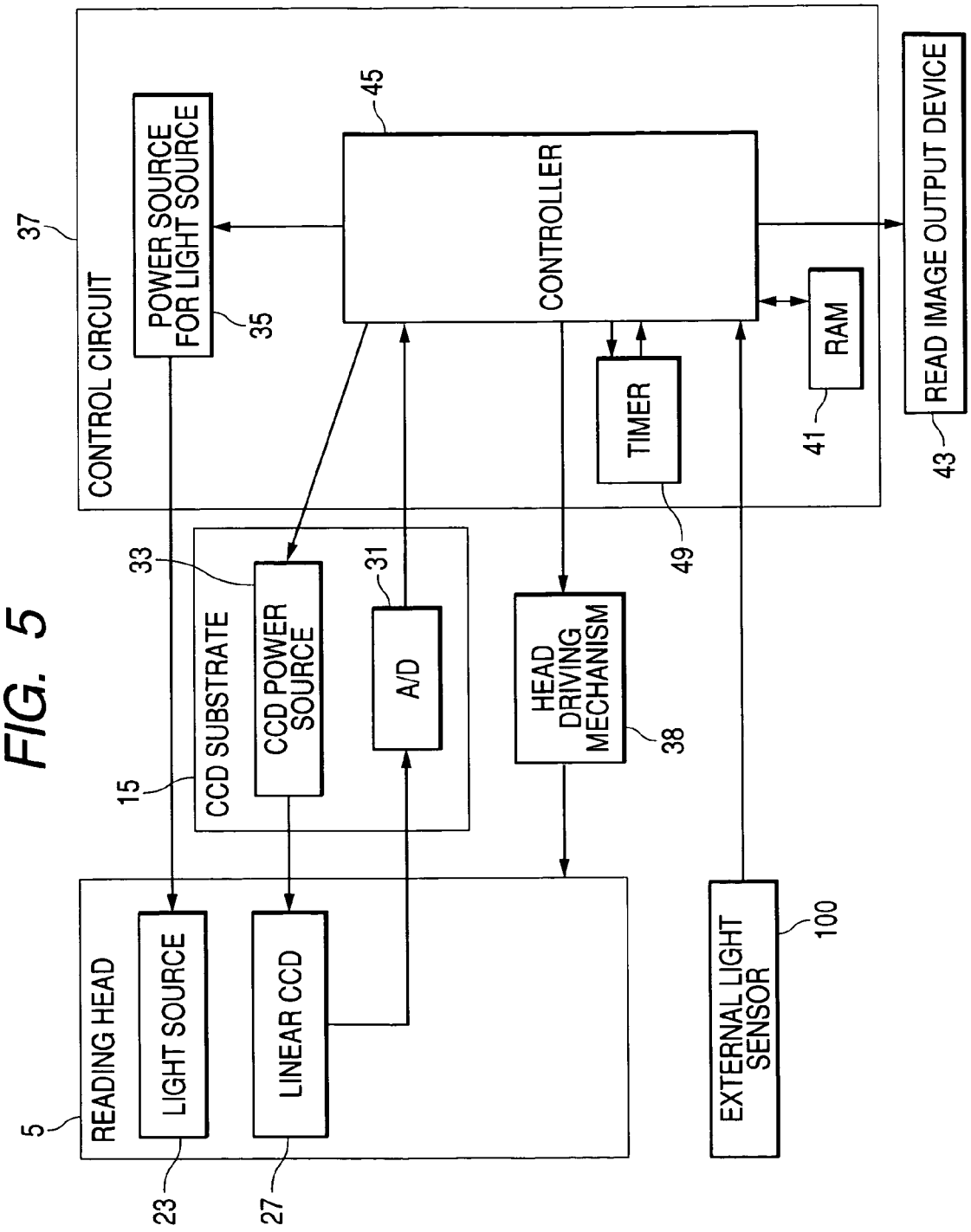
FIG. 5 is a block diagram showing the configuration of an image scanner 1.

FIG. 5 is a block diagram showing the configuration of the image scanner 1.

The image scanner 1 contains the above-mentioned reading head 5, a CCD substrate 15, an external light sensor 100, a head driving mechanism 38, a control circuit 37 and a read image output device 43.

The CCD substrate 15 is a circuit board which can process a signal output from the linear CCD 27 in the reading head 5 as described above. The CCD substrate 15 may be mounted in the reading head 5 or on the outside surface and moved together with the travel motion of the reading head 5 and alternatively may be mounted in a fixed location apart from the reading head 5. The CCD substrate 15 is provided with a CCD power source 33 and an A/D converter circuit 31 for example. The CCD power source 33 is turned on or is turned off according to a control signal from a controller 45 described later, power supplied from a power circuit not shown is supplied to the linear CCD 27 by turning on the CCD power source and in the meantime, the supply of power to the linear CCD 27 is stopped by turning off the CCD power source. The A/D converter circuit 31 inputs an analog electric signal output from the linear CCD 27, converts it to a digital electric signal and outputs to the controller 45 described later.

The external light sensor 100 is an optical sensor dedicated to the detection of external light and provided to sense external light incident on the body 10 via the surface 9 from the outside of the body 10 separately from an optical sensor (that is, the linear CCD 27) as an image sensor for inputting a read image of an original. The external light sensor 100 is a sensor having at least less power consumption than that of the linear CCD 27 and is an amorphous silicon semiconductor visible light sensor for example. The external light sensor 100 outputs an electric signal according to the intensity of received external light (in other words, the amount of received light) to the controller 45 of the control circuit 37 described later when the external light sensor senses external light. It will be described later where in the scanner 1 the external light sensor 100 is arranged.

The head driving mechanism 38 includes a belt for moving the reading head 5 along the shaft 11, a head drive motor for moving the belt to move the reading head 5 and a head driving circuit for driving the motor to move the reading head 5. A predetermined component (for example, the head driving circuit) of the head driving mechanism 38 receives a control signal from the controller 45 described later, moves the reading head 5 according to the control signal and controls its position.

The control circuit 37 is provided with a power source for a light source 35, a timer 49, RAM 41 and the controller 45.

The power source for the light source 35 is turned on and off according to a control signal from the controller 45. Power supplied from a power circuit not shown is supplied to the light source 23 by turning on the power source for the light source 35 and the supply of power to the light source 23 is stopped by turning off the power source for the light source 35.

The timer 49 starts operation according to a timer start instruction from the controller 45 and outputs a signal showing time-out to the controller 45 when time-out occurs.

RAM 41 is provided with a work area of the controller 45 and an image area in which the data of a linear read image input from the linear CCD 27 to the controller 45 every time the reading head 5 is moved is stored. The scanner 1 may contain not only RAM 41 but also a nonrewritable memory such as ROM and a rewritable nonvolatile memory such as EEPROM.

The controller 45 is CPU for example, and controls transition from a normal power mode to a power saving mode and transition from the power saving mode to the normal power mode, controls the position of the reading head 5 by controlling the operation of the head driving mechanism 38 and controls each operation of the power source for the light source 35, the CCD power source 33 and the timer 49.

For example, the controller 45 drives the timer 49 when predetermined operation is finished in the normal power mode and instructs the timer to start operation. The controller 45 turns the power mode from the normal power mode to the power saving mode when the controller receives a time-out signal from the timer 49 without the detection of a predetermined change of a state. In that case, the controller 45 turns off the CCD power source 33 and the power source for the light source 35 at the same timing or at different timing. The above-mentioned predetermined change of a state means that a signal value received from the external light sensor 100 makes a predetermined change (for example, the signal value is larger or smaller than a predetermined threshold or the amount of a change of the signal value is more than a predetermined amount), that a read command (a command to start reading operation) from a host not shown connected to the scanner 1 is received or that a read command is received by the operation of a button not shown of the scanner 1 by a user.

The controller 45 turns the power mode from the power saving mode to the normal power mode (that is, releases the power saving mode) when the predetermined change of a state is detected during the power saving mode. In that case, the controller 45 turns on the CCD power source 33 and the power source for the light source 35 at the same timing or at different timing.

The controller 45 turns on the power source for the light source 35 when an original is scanned and instructs the power source for the light source to supply predetermined power to the light source 23 so that a beam can be emitted from the light source 23. Afterward, the controller 45 instructs the head driving mechanism 38 to make the reading head 5 reach the home position (that is, the origin) (when the reading head is already located in the home position, the operation is not required) and instructs the head driving mechanism to move the reading head 5 from the position based upon the resolution of a generated read image. When the reading head 5 is moved, the controller 45 receives linear read image data from the linear CCD 27 via the A/D converter circuit 31 and stores the linear read image data in RAM 41. Thereby, the read image data of the whole original is stored in RAM 41. The controller 45 can instruct the read image output device 43 to output the read image data stored in RAM 41 at predetermined timing.

The read image output device 43 outputs the read image data stored in RAM 41. Concretely, the read image output device 43 includes at least one of following (1) to (5) for example:

(1) a data transmitter that transmits read image data to the host communicably connected to the image scanner 1 by wire or by wireless;

(2) a data transmitter that transmits read image data to a remote device communicably connected to the image scanner 1 via a communication network such as the Internet by an electronic mail for example;

(3) a facsimile transmitter that transmits read image data to a predetermined or user-desired destination via a public telephone network by facsimile;

(4) a data storage that stores read image data in an external storage (for example, a portable record medium such as a memory card or an exterior type hard disk) connected to the image scanner 1 so that the external storage can be detached (in this case, the image scanner 1 functions as a communication master or a communication host and the external storage functions as a communication slave or a communication device); and (5) a printer that prints read image data on a predetermined print medium (for example, plain paper or glossy paper) by an ink-jet method or electrophotography.

Space corresponding to the surface on which the original is to be put and composed of loci defined when the surface 9 is lowered perpendicularly is included in the internal space of the body 10. The space corresponding to the surface is a rectangular parallelopiped (or a solid), the lateral length of the space is the same as the lateral length SW of the surface 9, the longitudinal length is the same as the longitudinal length SL of the surface 9, and the height is the same as the height SD of the internal space of the body 10. It is considered that the intensity of external light detected in the space corresponding to the surface is stronger in case the external light irradiates from the perpendicular upside of the surface 9, compared with luminous energy detected outside the space corresponding to the surface.

The above-mentioned external light sensor 100 can be utilized for a sensor for detecting whether the original cover 3 is lifted or not as described later and further, can be also utilized for a sensor for detecting whether an original in predetermined size is put on the surface 9 or not and whether the original is removed from the surface 9 or not. The external light sensor 100 can be arranged inside the body 10. The concrete mode of the arrangement of the external light sensor 100, the following first to fourth modes are conceivable.

(A) First Arrangement Mode

Figure 6:
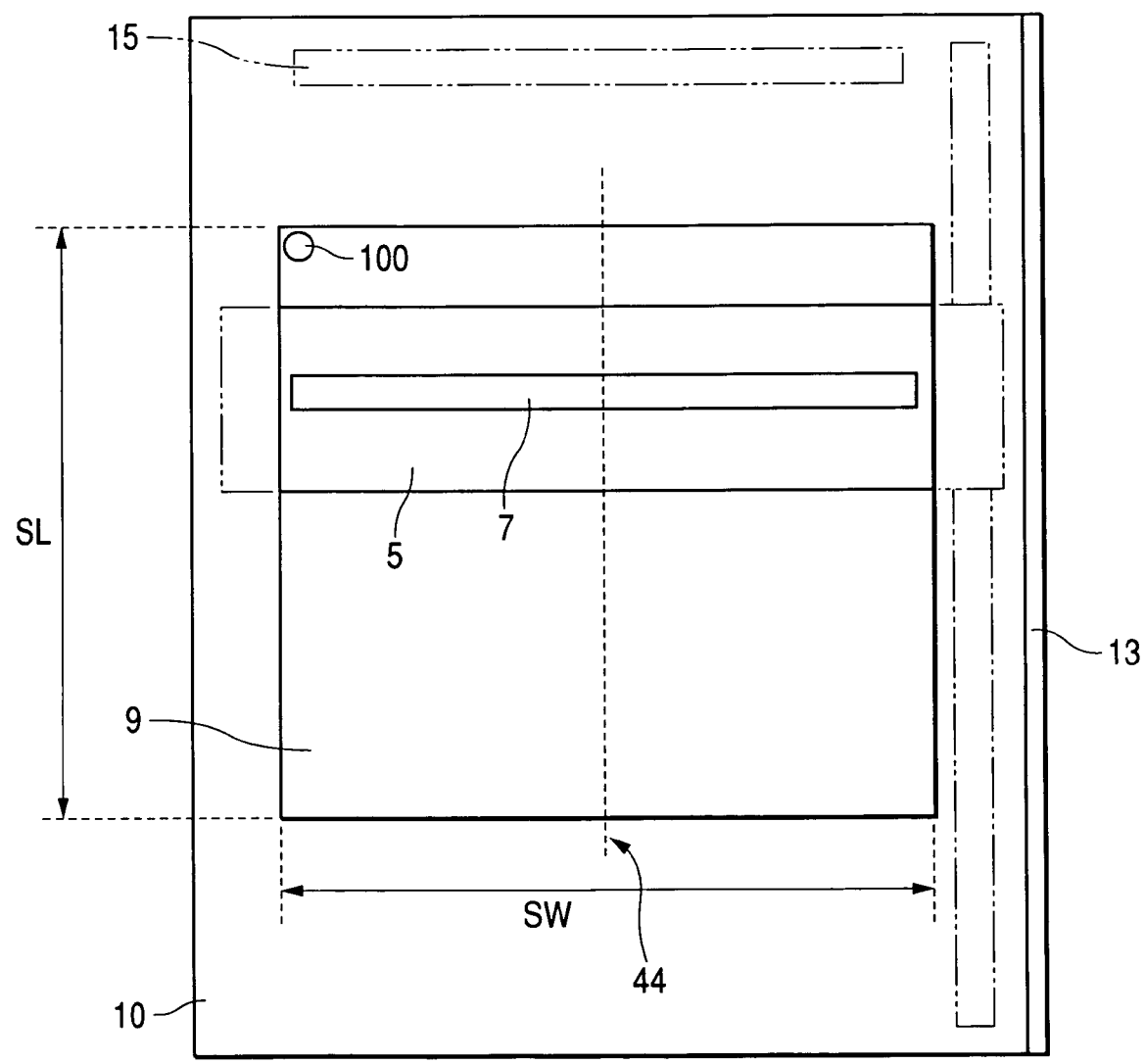
FIG. 6 is an explanatory drawing for explaining a first arrangement mode of an external light sensor 100.
Figure 7:
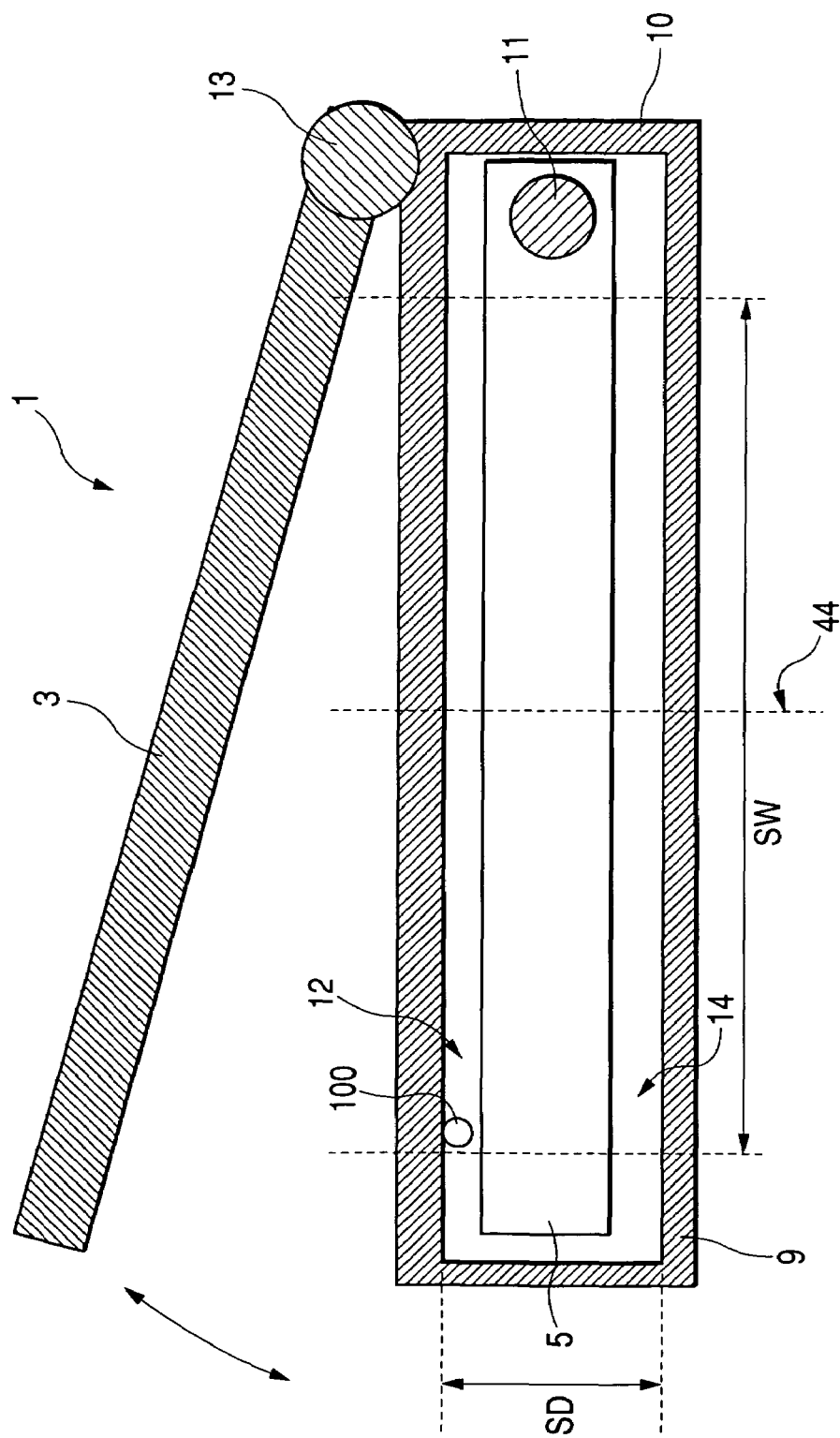
FIG. 7 is an explanatory drawing for explaining the first arrangement mode of the external light sensor 100.

Referring to FIGS. 6 and 7, a first arrangement mode will be described below.

The external light sensor 100 is arranged in a location in a range in which external light incident on the inside of the body 10 can be detected and far from the center of the surface 9 in distance from a pivotal portion where the original table and the original cover 3 are coupled (that is, the turning shaft 13). Concretely, in case a face including a side of the pivotal portion is a base face and a face including a side opposite to the pivotal portion is an end face in the body 10, the external light sensor 100 is arranged on the side closer to the end face than the center 44 of the space corresponding to the surface. It is desirable that the external light sensor 100 is arranged on the farthest face from the base face in the space corresponding to the surface or in the vicinity. At that time, it is preferable that the external light sensor 100 is arranged in a higher position 12 than a traveling route of the reading head 5 (for example, in a shallow position in the body 10) so that the external light sensor can easily receive external light (the external light sensor may be also arranged in a lower position 14 (for example, in a deep position in the body 10) than the traveling route).

According to the first arrangement mode, in case the closed original cover 3 is opened, the external light sensor 100 can detect that the original cover 3 is opened sooner, compared with a case that the external light sensor is provided on the closer side to the base face than the center of the space corresponding to the surface.

(B) Second Arrangement Mode

Figure 8:
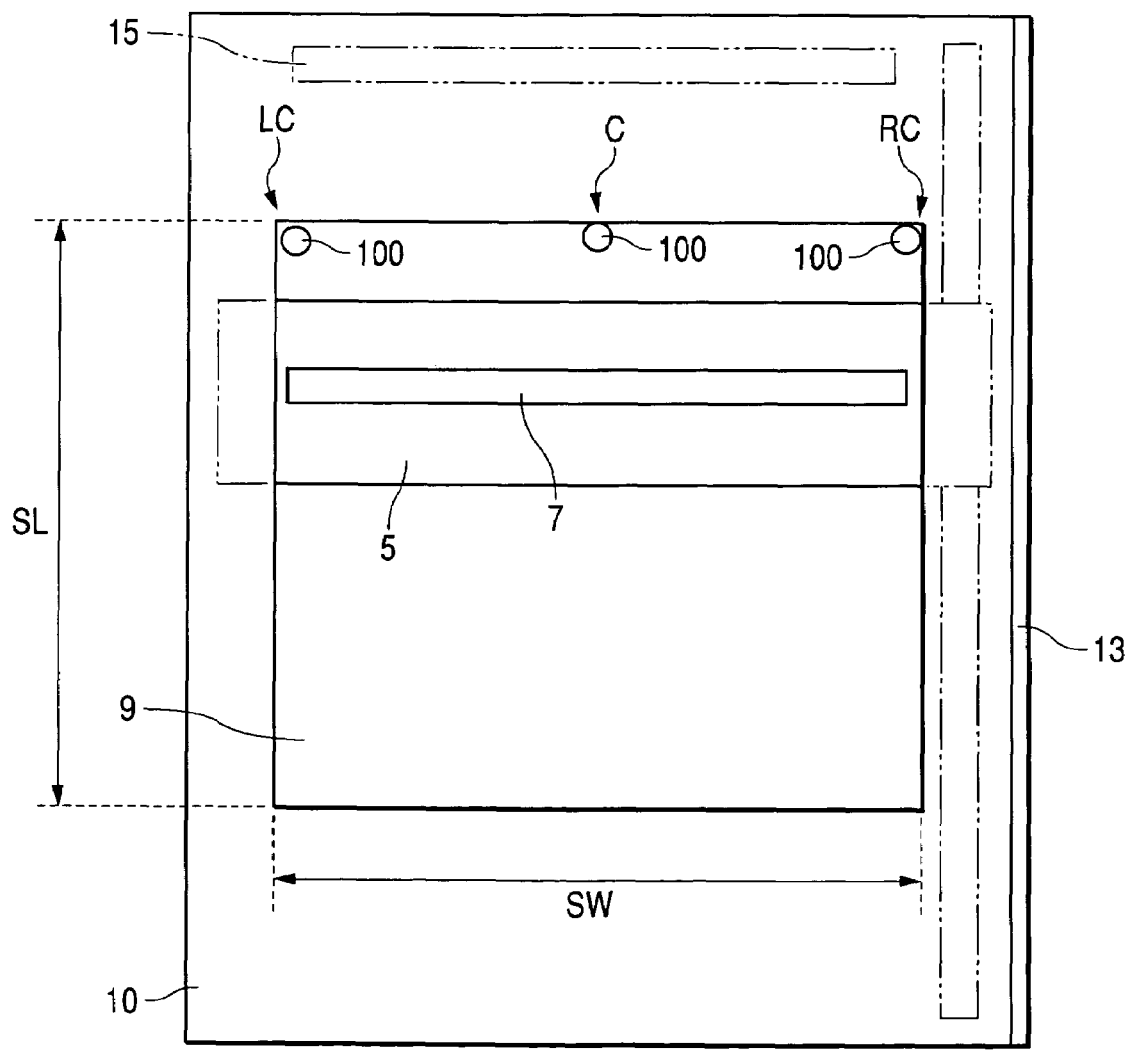
FIG. 8 is an explanatory drawing for explaining a second arrangement mode of the external light sensor 100.

The external light sensor 100 is arranged in a location in which the intensity of external light incident on the external light sensor 100 varies (for example, in the space corresponding to the surface or in the vicinity) depending upon whether an original is put on the surface 9 of the original table or not. Concretely, a positioning point for positioning an original is provided to the surface 9 of the original table, and the external light sensor 100 is arranged in a location in which most incident paths of external light are intercepted by an original when the original in predetermined size is positioned and put in the positioning point. Referring to FIG. 8, the description will be made below. In the following description, "the upside", "the downside", "the right" and "the left" mean directions of the upside, the downside, the right and the left on the drawings and "the inside" means a direction from this side to the other side on the drawings.

The external light sensor 100 is arranged in a predetermined position (or in the vicinity) inside a location on the surface 9 in which a predetermined part of an original is overlapped. Concretely, in case an original is laid so that the left upper corner of the original is overlapped with the left upper corner of the surface 9, the external light sensor 100 is provided in a predetermined position (or in the vicinity) LC inside the left upper corner of the surface 9. Besides, in case an original is laid so that the center of the upper fringe of the original is overlapped with the center of the upper fringe of the surface 9, the external light sensor 100 is provided in a predetermined position (or in the vicinity) C inside the center of the upper fringe of the surface 9. Further, in case an original is laid so that the right upper corner of the original is overlapped with the right upper corner of the surface 9, the external light sensor 100 is provided in a predetermined position (or in the vicinity) RC inside the right upper corner of the surface 9.

In the second arrangement mode, it is desirable that the external light sensor 100 is arranged in depth as closed as possible to the surface 9. However, as in the first arrangement mode, the external light sensor may be also arranged in a deep location lower than the traveling route of the reading head 5.

According to the second arrangement mode, it can be detected whether an original is put on the surface 9 or not, whether the original is removed or not and whether the intensity of external light varies when the original cover 3 is closed or not. Hereby, it can be detected that an original is put, the original is removed (or is replaced) and the original cover 3 is closed as a sign of usage by a user other than the sign the original cover 3 is lifted (that is, as a sign that the image scanner 1 can be used by a user).

(C) Third Arrangement Mode

The external light sensor 100 is mounted on the outside surface or inside the reading head 5. Concretely, as shown in FIG. 9, the external light sensor 100 is arranged on the outside surface of the reading head 5 opposite to the surface 9 (that is, on the top face on which the external light sensor can easily receive external light) More concretely, the external light sensor 100 is arranged in a location on the top face of the reading head 5 and in a far location on the side of the end from the center of the space corresponding to the surface which the reading head 5 passes when it travels.

Figure 9:
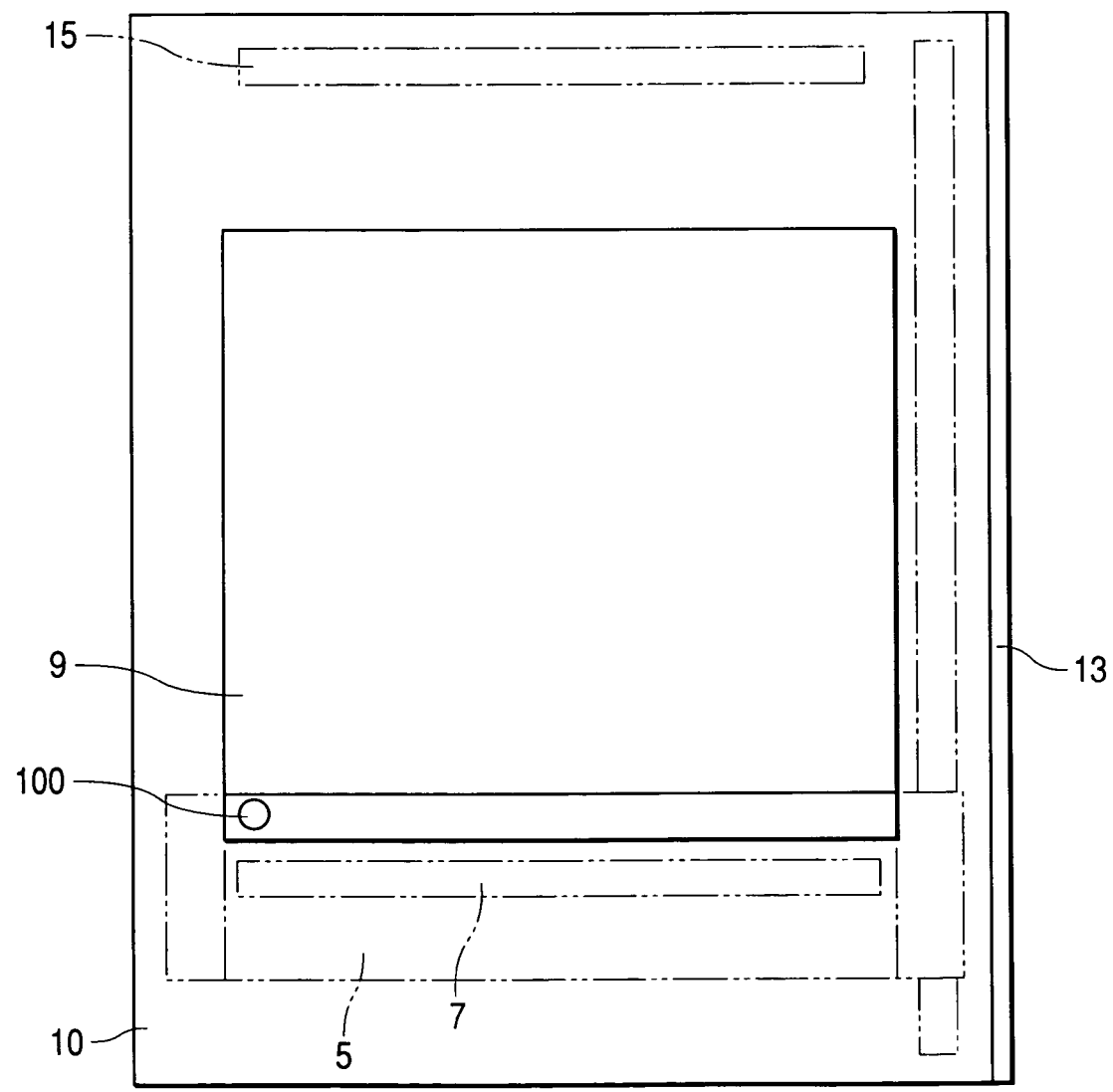
FIG. 9 is an explanatory drawing for explaining a third arrangement mode of the external light sensor 100.

In the third arrangement mode, the controller 45 (see FIG. 5) controls the head driving mechanism 38 in case the reading of an original is not performed (for example, during the power saving mode) and makes the reading head 5 on standby in a predetermined location (for example, in the home position) such as a position in which the external light sensor 100 can detect external light (for example, a position in the space corresponding to the surface) as shown in FIG. 9. In that case, the controller 45 moves the reading head 5 to the home position and instructs the reading head to start reading operation if the reading head 5 is not on standby in the home position when the reading operation is started.

In the third arrangement mode, the controller 45 moves the reading head 5 to a location in which the intensity of external light incident on the external light sensor 100 varies depending upon whether an original is put on the surface 9 of the original table or not. Therefore, the external light sensor 100 is located when the normal power mode is turned to the power saving mode and may be also make the reading head on standby in that location during the power saving mode. Concretely, the controller 45 moves the reading head 5 to a location in which an original in predetermined size is positioned at the positioning point, most incident paths of external light are intercepted by the original when the original is put and therefore, the external light sensor 100 is located when the normal power mode is turned to the power saving mode and may also make the reading head on standby in that location during the power saving mode.

(D) Fourth Arrangement Mode

Figure 10:
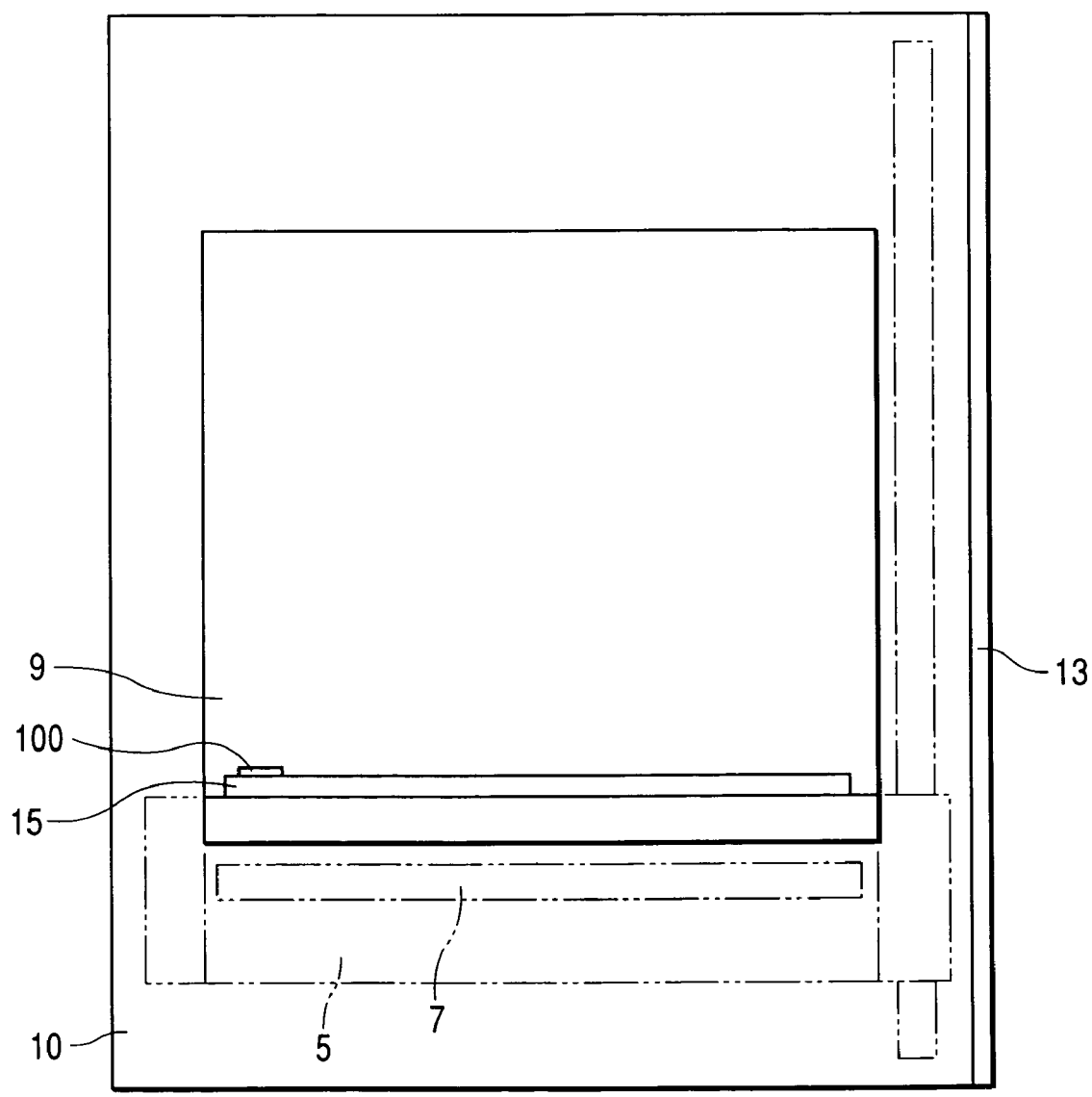
FIG. 10 is an explanatory drawing for explaining a fourth arrangement mode of the external light sensor 100.

The external light sensor 100 is mounted on the CCD substrate 15. Concretely, as shown in FIG. 10, the external light sensor 100 is arranged on the CCD substrate 15 mounted on the outside surface of (or inside) the reading head 5. More concretely, the external light sensor 100 is arranged in a far location on the side of the end from the center of the space corresponding to the surface in which the reading head 5 passes when the reading head travels there.

In the fourth arrangement mode, the controller 45 (see FIG. 5) controls the head driving mechanism 38 in case the reading of an original is not performed (for example, while the power saving mode is executed) and makes the reading head 5 on standby in a predetermined location (for example, the home position) in which the external light sensor 100 can detect external light (for example, a predetermined position under the surface 9) as shown in FIG. 10. In that case, the controller 45 instructs the reading head to start reading operation after the controller moves the reading head 5 to the home position if the reading head 5 is not on standby in the home position when the reading operation is started.

In the fourth arrangement mode, the controller 45 also moves the reading head 5 to a location in which the intensity of external light incident on the external light sensor 100 varies depending upon whether an original is put on the surface 9 of the original table or not and therefore, the external light sensor 100 is located when the normal power mode is turned to the power saving mode and may also make the reading head on standby in that location during the power saving mode concretely, when the normal power mode is turned to the power saving mode, the controller 45 moves the reading head 5 to a location in which most incident paths of external light are intercepted by an original when the original in a predetermined size is positioned and put at the positioning point and therefore, the external light sensor 100 is located and may also make the reading head on standby in that location during the power saving mode.

The concrete examples in the arrangement modes of the external light sensor 100 have been described.

The image scanner 1 according to this embodiment can be turned from the normal power mode to the power saving mode as described above based upon a signal value output from the external light sensor 100 and its variation and can release the power saving mode.

Figure 11:
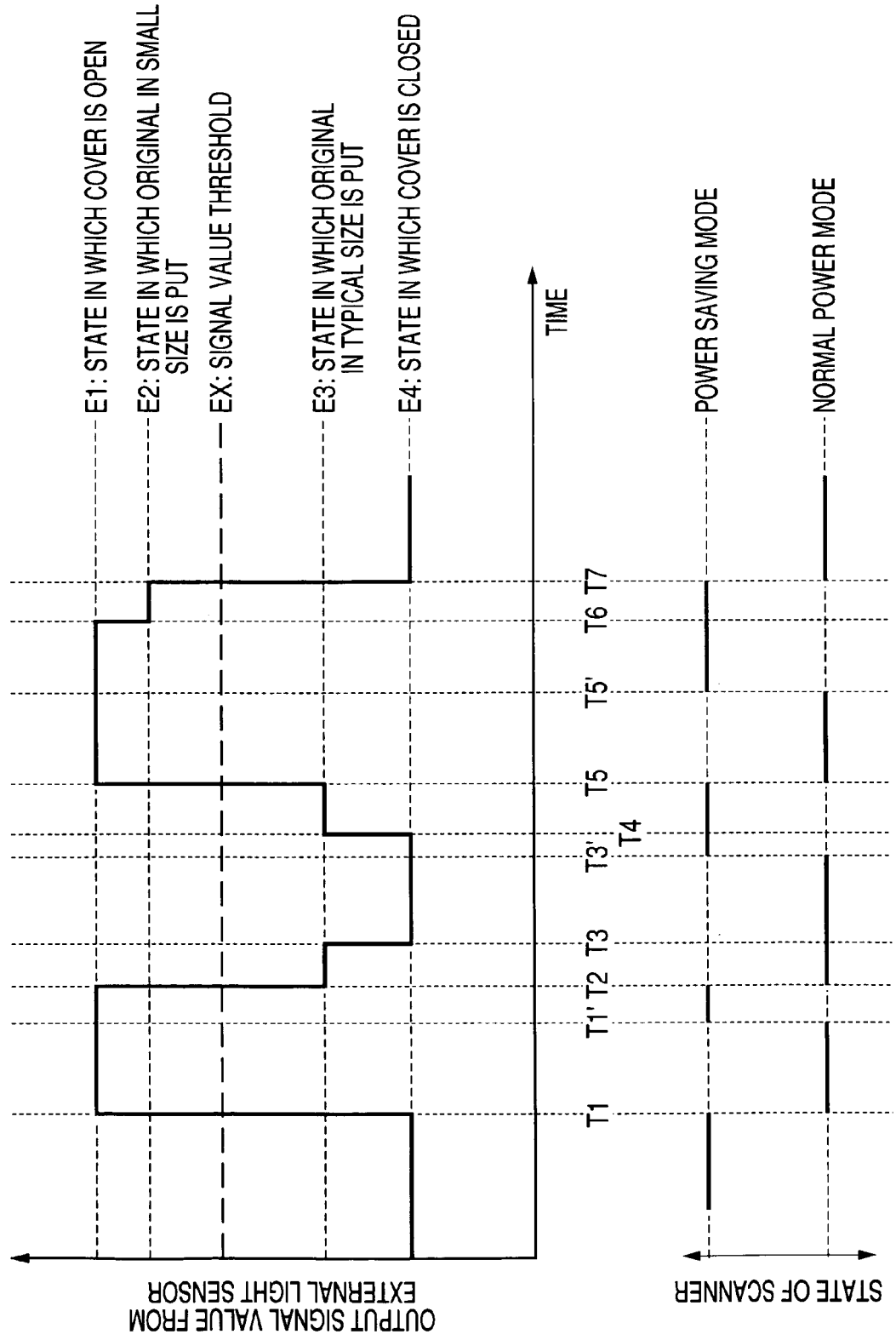
FIG. 11 shows an example of relation between a signal value output from the external light sensor 100 and its variation and a power mode in the scanner 1.

FIG. 11 shows one example of relation between a signal value output from the external light sensor 100 and its variation and the power mode in the scanner 1. Referring to FIG. 11, an example of the flow when the normal power mode is turned to the power saving mode and the power saving mode is released will be described below. In the following description, an original put on the surface 9 of the body 10 shall be an original having transmissivity in which at least slight light can be transmitted.

As external light does not pass the surface 9 of the body 10 of the scanner 1 and cannot be incident on the scanner 1 in case the original cover 3 of the image scanner 1 is closed, the external light sensor 100 arranged inside the scanner 1 substantially detects no external light. Therefore, a signal value output from the external light sensor 100 is the smallest value E4.

When the predetermined change of a state is not detected and fixed time elapses since predetermined operation is finished in the scanner 1, the scanner 1 turns from the normal power mode to the power saving mode. During the power saving mode, the power source for the light source 35 and the CCD power source 33 are turned off and no power is supplied to the light source 23 and the linear CCD 27.

In this state, suppose that the original cover 3 is lifted at time T1.

In that case, if no original is put on the surface 9 of the body 10, much external light are incident on the inside of the body 10 and the external light sensor 100 senses the external light. Then, as shown in FIG. 11, the external light sensor 100 outputs a signal having a high value E1 according to the much external light and inputs the signal to the controller 45.

The controller 45 releases the power saving mode if a value of the signal input from the external light sensor 100 exceeds a predetermined threshold EX and instructs to start a warmup for reading operation (concretely, the controller 45 turns on the power source for the light source 35 and the CCD power source 33 so as to start the supply of power to the light source 23 and the linear CCD 27). Simultaneously, the controller 45 instructs the timer 49 to start.

In case no original is put and the original cover 3 remains open after the original cover 3 is lifted at the time T1, signals having a high value E1 continue to be output from the external light sensor 100. When predetermined operation (for example, an original is put, the original cover 3 is closed or reading operation in which the reading head 5 travels) is not executed since the time T1 and fixed time elapses to be at time T1' (that is, when time-out occurs), the controller 45 turns the power mode from the normal power mode to the power saving mode. Concretely, the controller 45 turns off the power source for the light source 35 and the CCD power source 33 so that no power is supplied to the light source 23 and the linear CCD 27.

Afterward, when an original in typical size (for example, in A4 size) is put on the surface 9 at time T2, most incident paths of external light are intercepted by the original and the luminous energy of external light sensed by the external light sensor 100 greatly decreases. Therefore, a value of a signal output by the external light sensor 100 turns a relatively low value E3 from the high value E1 (that is, the external light sensor 100 is provided to a location in which most incident paths of external light are intercepted by the original in predetermined size. This will be described later).

The controller 45 releases the power saving mode if the value E3 of a signal input from the external light sensor 100 is smaller than the predetermined threshold EX (that is, if a value of the signal input from the external light sensor 100 is smaller than the predetermined threshold) and instructs to start a warmup for reading operation. Simultaneously, the controller 45 instructs the timer 49 to start.

As external light is substantially not incident on the surface 9 and on the side of the body 10 at all when the original cover 3 is closed afterward (at time T3), a value of a signal output from the external light sensor 100 turns from the relatively low value E3 to the lowest value E4. At that time, the controller 45 resets and restarts the time 49 (the timer is not necessarily to be reset and restarted).

When no predetermined operation is executed and fixed time elapses to be at time T3' (that is, when time-out occurs) since the timer 49 is restarted at the time T3, the controller 45 turns the power mode from the normal power mode to the power saving mode again.

Suppose that the original cover 3 is lifted at time T4 during the power saving mode. However, as the original in typical size remains put on the surface 9 of the body 10, the amount of external light sensed by the external light sensor 100 is not so much and therefore, a value of a signal output from the external light sensor 100 is the relatively low value E3 which does not exceed the predetermined threshold EX. In that case, the controller 45 does not release the power saving mode (at this time, the controller 45 releases the power saving mode and may also turn it to the normal power mode).

When the original in typical size is removed from the surface 9 at time T5 afterward, much external light is incident on the inside of the body 10 and the external light sensor 100 senses the much external light. Therefore, a value of a signal output from the external light sensor 100 changes from the relatively low value E3 to the high value E1, that is, exceeds the predetermined threshold EX. In that case, the controller 45 releases the power saving node and instructs to start a warmup for reading operation. Simultaneously, the controller 45 instructs the timer 49 to start.

In case no original is put and the original cover 3 remains open after the original is removed from the surface 9 at the time T5, signals having the high signal value E1 continue to be output from the external light sensor 100. When no predetermined operation is executed since the time T1 and fixed time elapses to be at time T5' (that is, when time-out occurs), the controller 45 turns the power mode from the normal power mode to the power saving mode.

Suppose that an original in smaller size (for example, B5 size) than the typical size is put on the surface 9 at time T6 afterward. In that case, the luminous energy of external light incident on the inside of the body 10 decreases though the luminous energy is not smaller than that in case the original in the typical size is put. Therefore, a value of a signal output from the external light sensor 100 changes from the high value E1 to a pretty high value E2.

The controller 45 releases the power saving mode if a value of a signal input from the external light sensor 100 is smaller than the predetermined threshold EX, however, as the signal value E2 input at the time T6 is not smaller than the detective threshold EX, the controller does not release the power saving mode (at this time, the controller may also reset and restart the timer or may not reset and restart the time).

When the original cover 3 is closed at time T7 afterward, no substantial external light is incident on the surface 9 and the inside of the body 10. Therefore, an output signal value of the external light sensor 100 changes from the relatively high value E2 to the lowest value E4, that is, is smaller than the predetermined threshold EX. In that case, the controller 45 releases the power saving mode and instructs to start a warmup for reading operation. Simultaneously, the controller 45 instructs the timer 49 to start.

According to the above description, the controller 45 is operated as described below.

Figure 12:
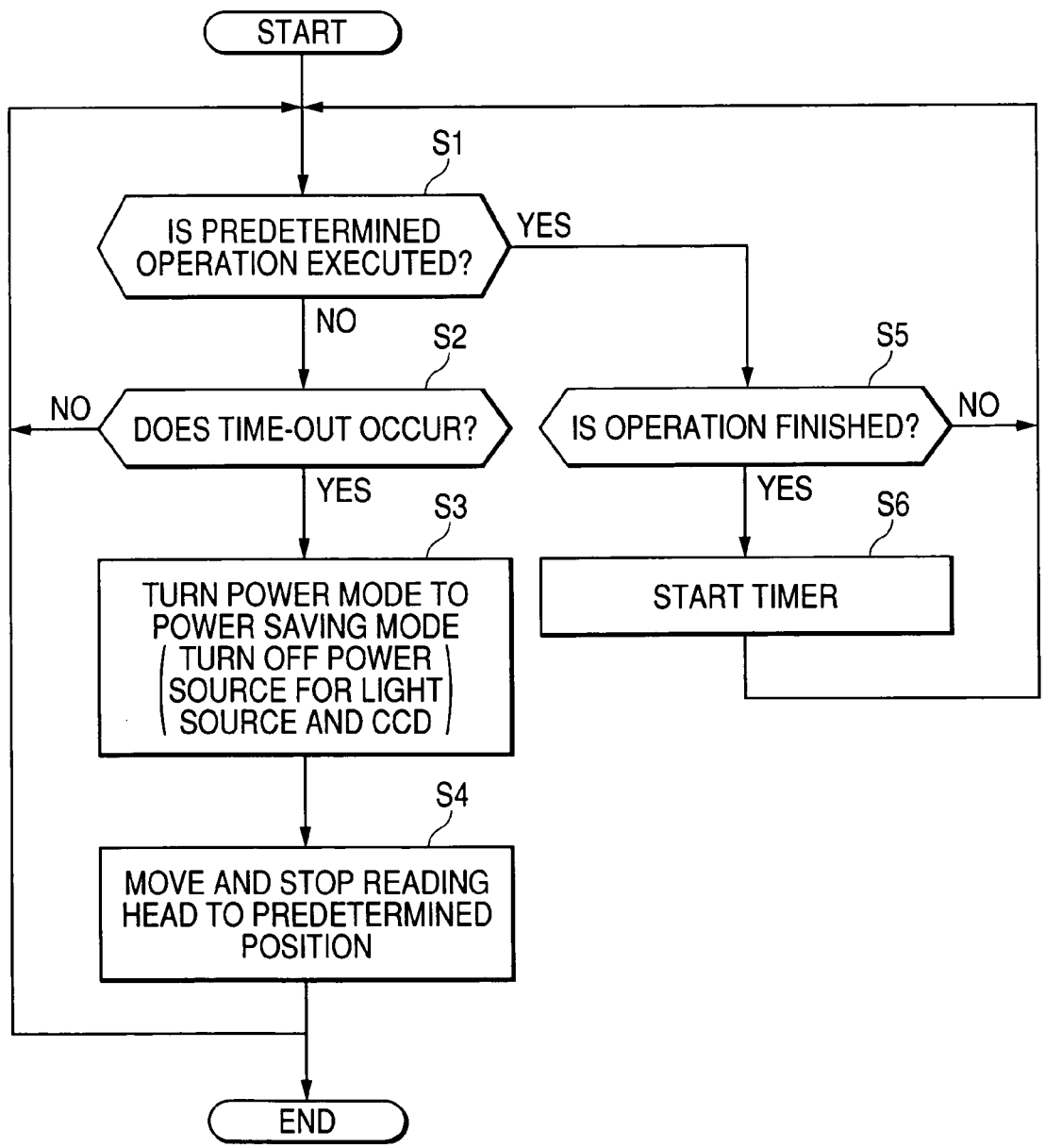
FIG. 12 shows the operational flow of a controller 45 in case the current power mode is turned to the power saving mode.
Figure 13:
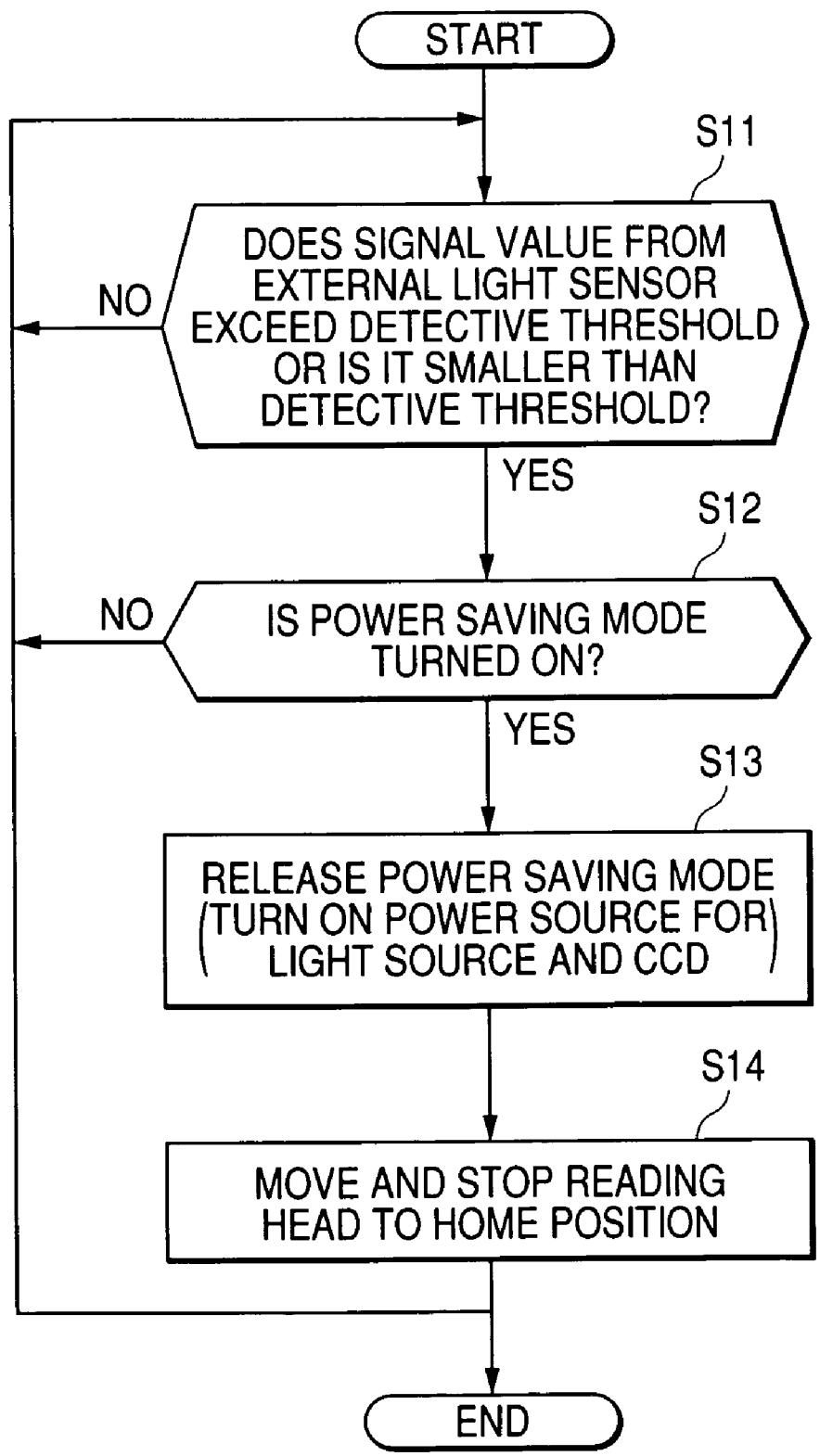
FIG. 13 shows the operational flow of the controller 45 in case the power saving mode is released.

FIG. 12 shows the operational flow of the controller 45 in case the power mode is turned to the power saving mode and FIG. 13 shows the operational flow of the controller 45 in case the power saving mode is released.

As shown in FIG. 12, the controller 45 continues to execute the following process if in the normal power mode, predetermined operation (for example, reading an image of an original) is being executed (Y in a step S1 and N in a step S5).

The controller 45 instructs the timer 49 to start (S6) when the predetermined operation is finished (Y in S1 and Y in S5).

When time-out occurs (N in S1 and Y in S6) without predetermined operation after S6, the controller 45 turns the power mode from the normal power mode to the power saving mode. Concretely, the controller 45 turns off the CCD power source 33 and the power source for the light source 35 to stop the supply of power to the linear CCD 27 and the light source 23. Besides, the controller 45 moves the reading head 5 to a predetermined location in which the intensity of external light incident on the external light sensor 100 varies depending upon whether an original is put on the surface 9 or not or whether the cover 3 is closed or not and therefore, the external light sensor 100 is located when the power mode is turned to the power saving mode in case the external light sensor 100 is located on the reading heads (or on the circuit board 15 mounted on the reading head) and stops the reading head (S4). The controller 45 instructs the reading head 5 to remain in the predetermined location during the power saving mode.

When during the power saving mode, a signal value input from the external light sensor 100 to the controller 45 exceeds the predetermined detective threshold EX or is smaller than the threshold (Y in S11) as shown in FIG. 13, the controller 45 releases the power saving mode (Y in S12 and S13). Concretely, the controller 45 turns on the CCD power source 33 and the power source for the light source 35 so that power is supplied to the linear CCD 27 and the light source 23. The controller 45 moves the reading head 5 to the home position and stops it there in case the reading head 5 is not on standby in the home position (S14).

The transition from the normal power mode to the power saving mode and the release of the power saving mode are performed according to the flow of the above-mentioned process.

According to the flow of the above-mentioned process, the controller 45 releases the power saving mode when the closed original cover is opened in the power saving mode (concretely, when it is detected that a signal value input from the external light sensor 100 is larger than the predetermined threshold and/or the amount of the increase of the signal value is more than a predetermined amount). The controller 45 turns the power mode from the normal power mode to the power saving mode even if the original cover 3 remains open when predetermined operation such as an original in typical size is put is not executed and fixed time elapses (that is, when time-out occurs) since the original cover 3 is lifted. When the open original cover 3 is closed or an original is put on the surface 9 in the power saving mode, the power saving mode is released again.

Besides, according to the flow of the above-mentioned process, the controller 45 releases the power saving mode when an original in typical size is put on the surface 9 of the original table in case the original cover 3 is open and the power saving mode is turned on. Afterward, the controller 45 turns the power mode from the normal power mode to the power saving mode even if the original is put on the surface 9 and the original cover 3 remains open when predetermined operation such as the cover 3 is closed is not executed and fixed time elapses (that is, when time-out occurs). The controller 45 releases the power saving mode when the open original cover 3 is closed or the original in typical size put on the surface 9 is removed from the surface 9 in the power saving mode (concretely, when it is detected that a signal value from the external light sensor 100 is smaller than the predetermined threshold EX and/or the decreased amount of the signal value is more than the predetermined amount).

According to the flow, a sign of use by a user such as an original in typical size is put on the surface 9, the original in typical size is removed from the surface 9 and the original cover 3 is closed except that the original cover 3 is lifted can be detected, and when at least one of signs of use by a user is detected during the power saving mode, the power saving mode is released. Hereby, the total reading time of the image scanner can be more reduced.

The above-mentioned "location in which most incident paths of external light are intercepted by an original in predetermined size" is as follows.

Figure 14A:
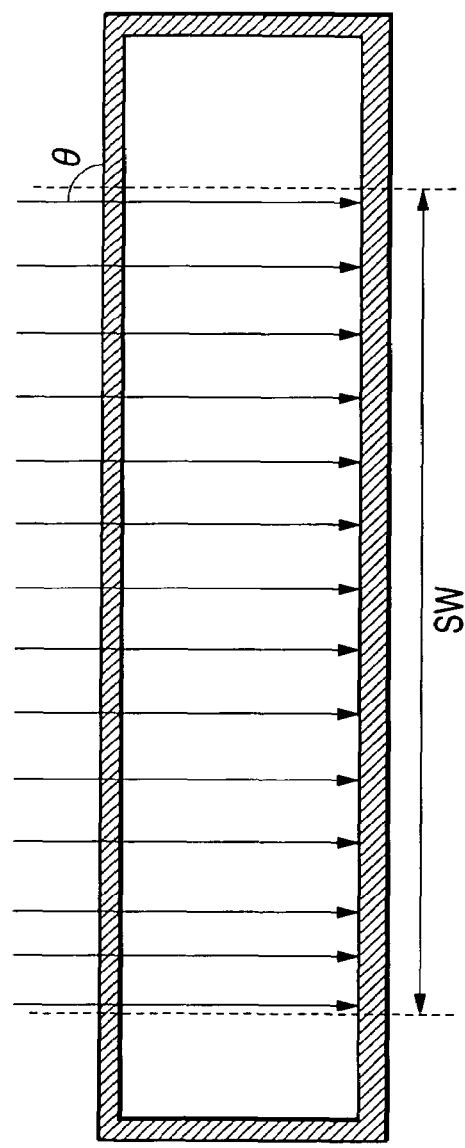
FIGS. 14A and 14B are explanatory drawings for explaining a location in which most incident paths of external light are intercepted by an original in predetermined size.

That is, as shown in FIG. 14A, as external light can be transmitted in any part on the surface 9 in case an original in predetermined size is not put on the surface 9, incident paths of external light in the body 10 substantially include the space corresponding to the surface itself (or further, its vicinity) (an angle θ of the incidence on the surface 9 of external light is not limited to 90 degrees as shown in FIG. 14A and in case 0<θ<90 degrees, incident paths of external light include the space corresponding to the surface and its vicinity).

Figure 14B:
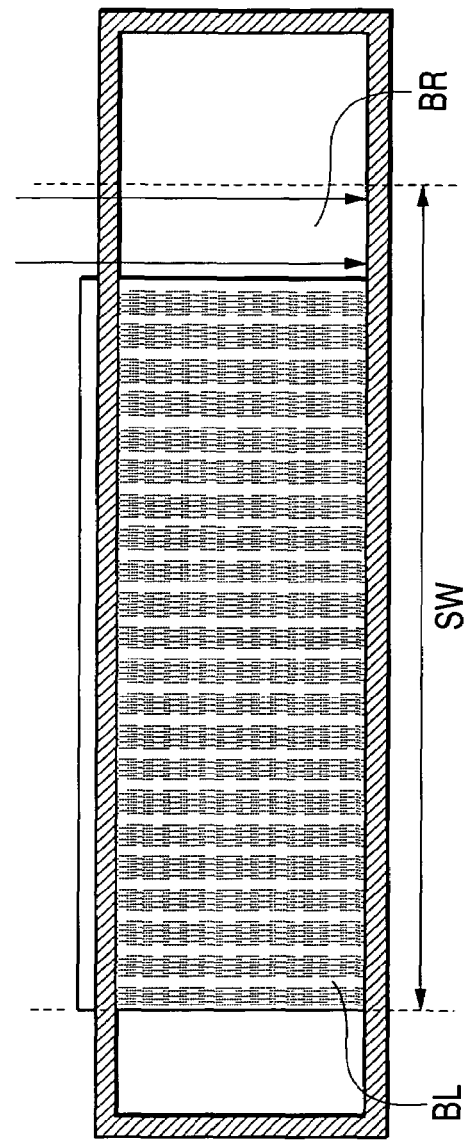

However, as shown in FIG. 14B, when a predetermined part (for example, the corner) of an original is overlapped with the original positioning point of the surface 9 (for example, the corner of the surface 9) and the original in predetermined size is put on the surface 9, a range in which external light can be transmitted on the surface is narrowed by the size of the original. Therefore, most incident paths of external light are intercepted by the put original in predetermined size and the space corresponding to the surface (or further, its vicinity) is/are divided into an area BR in which the received intensity of external light is substantially the same as that before the original is put and an area BL in which external light is intercepted and the received intensity of external light is weaker than that in the area BR. A location in the latter area BL (in other words, an area including the outside frame of the original in predetermined size in the space corresponding to the surface or its vicinity) is equivalent to "a location in which most incident paths of external light are intercepted by an original in predetermined size".

A range of this area BL is different depending upon a value of an angle θ of the incidence of external light, however, the external light sensor 100 is arranged in a location in which the received intensity of external light decreases when an original in predetermined size is put even if the angle θ of the incidence is any value.

In the above-mentioned embodiment, the following some transformed examples are conceivable.

(a) FIRST TRANSFORMED EXAMPLE

The power saving mode includes a sub power saving mode and a main power saving mode. In case the normal power mode is turned to the power saving mode, transition is made in the order of the sub power saving mode from the normal power mode and the main power saving mode from the sub power saving mode. In case the power saving mode is turned to the normal power mode, the power saving mode is released in the order of the sub power saving mode from the main power saving mode and the normal power mode from the sub power saving mode. Concretely, the controller 45 stops the supply of power to light-sensitive unit for reading (in the above embodiment, the linear CCD 27) or reduces supplied power to the light-sensitive unit for reading than that in the normal power mode when the normal power mode is turned to the sub power saving mode. When fixed time elapses since that time, the controller 45 turns the sub power saving mode to the main power saving mode, that is, stops the supply of power to the light source 23 or reduces supplied power to the light source 23 than that in the normal power mode. The controller 45 instructs to start first the supply of power to the light source 23 in case the power saving mode is turned to the normal power mode or increase power supplied to the light source 23 than that in the main power saving mode and afterward, instructs to start the supply of power to the light-sensitive unit for reading or increases power supplied to the light-sensitive unit for reading than that in the sub power saving mode. As described above, total time required for reading can be reduced more and power consumption can be inhibited respectively by stopping or starting the supply of power in time difference.

(b) SECOND TRANSFORMED EXAMPLE

The predetermined detective threshold EX may be also a fixed value and may be also a variable value. In the case of the latter, the controller 45 varies by the following method.

That is, another optical sensor which can sense a beam irradiating the outside surface of the scanner 1 is arranged on the outside surface of the image scanner 1 (hereinafter, another optical sensor is called a peripheral optical sensor) and light sensed by the optical sensor is called peripheral light). The peripheral optical sensor inputs a signal having a value according to the intensity of sensed peripheral light to the controller 45.

A threshold table in which plural detective thresholds corresponding to plural peripheral light intensity are recorded is prepared in the memory (for example, EEPROM) in the image scanner 1.

The controller 45 acquires the detective threshold EX corresponding to a value of a signal input from the peripheral optical sensor from the threshold table at arbitrary time (for example, when the power source of the body is turned on or when reading operation is started) and the acquired detective threshold is set as a detective threshold this time.

A method of varying a detective threshold is not limited to a method of referring to a table and various methods can be adopted. For example, the controller 45 stores signal values (in other words, the detected intensity of external light) input from the external light sensor 100 since predetermined time (for example, since the power source of the body is turned on this time or first or since reading operation is started this time or first) in the memory (for example, RAM or EEPROM) as a history, and may also vary a detective threshold based upon the signal values stored in it (for example, based upon the minimum value and the maximum value of signal values)

(c) THIRD TRANSFORMED EXAMPLE

In case power is also supplied to the read image output device 43 from a predetermined power circuit and the read image output device 43 also has a power saving mode and a normal power mode, the controller 45 turns the power mode of the read image output device 43 to the normal power mode or to the power saving mode based upon a signal value from the external light sensor 100. Concretely, the controller 45 turns the read image output device 43 to the power saving mode (concretely, stops the supply of power to the read image output device 43 or reduces supplied power to it) in case the supply of power to at least one of the light-sensitive unit for reading and the light source is stopped or supplied power to at least one is reduced when the read image output device 43 is in the normal power mode. Besides, the controller 45 releases the power saving mode of the read image output device 43 (concretely, starts the supply of power to the read image output device 43 or increases supplied power to it) in case the supply of power to at least one of the light-sensitive unit for reading and the light source is started or supplied power to it is increased when the read image output device 43 is in the power saving mode.

(d) FOURTH TRANSFORMED EXAMPLE

Figure 15:
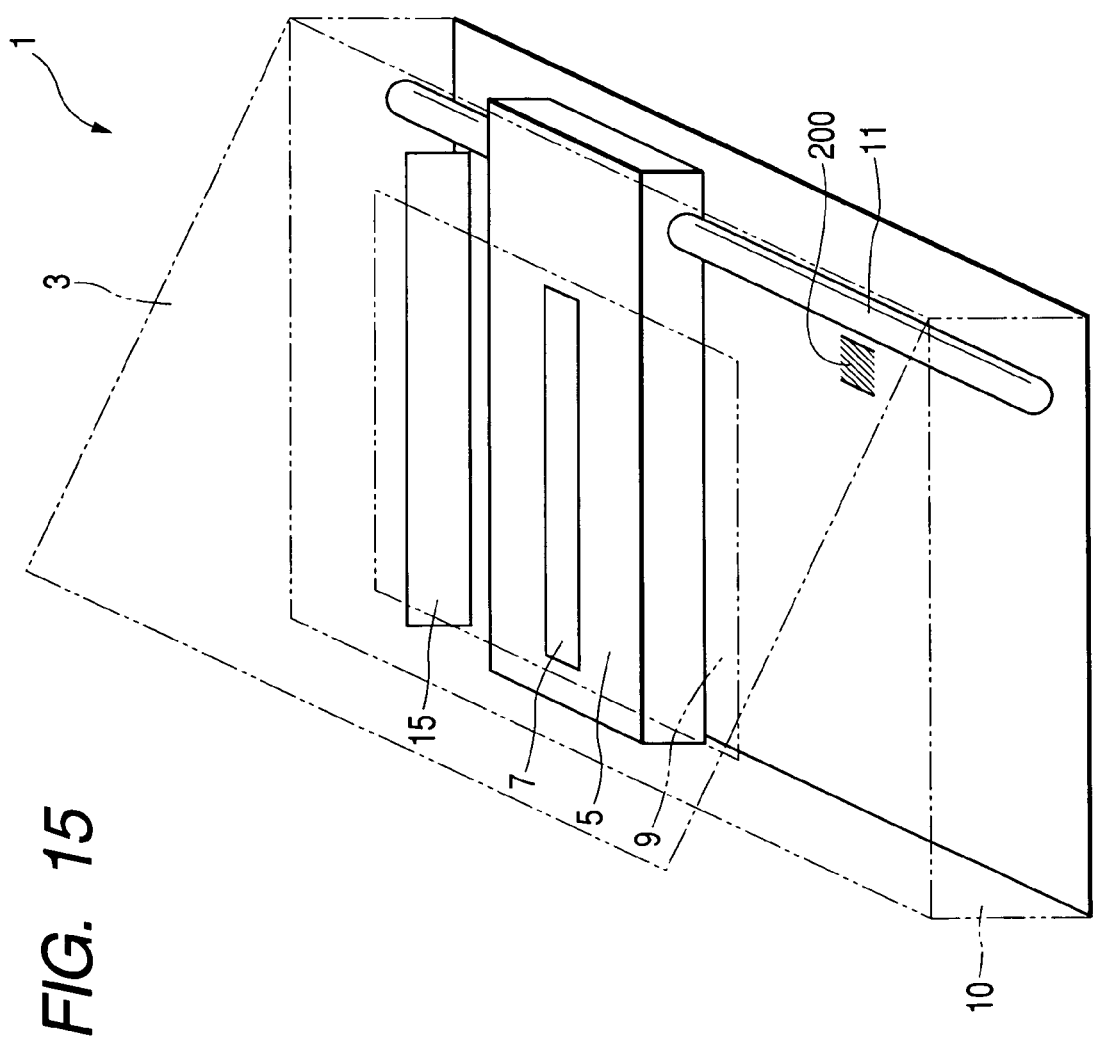
FIG. 15 is an explanatory drawing for explaining a fourth transformed example.

Referring to FIG. 15, a fourth transformed example will be described below.

As shown in FIG. 15, a cover opening/closing sensor 200 for sensing the opening/closing of the original cover 3 is provided to the image scanner 1.

The cover opening/closing sensor 200 is mounted in the pivotal portion of the original table and the original cover 3 (for example, a hinge for coupling the original cover 3 to the original table or the turning shaft 13) or the vicinity (the cover opening/closing sensor may be also mounted in a far location from the center of the surface 9 in a distance from the pivotal portion of the original table and the original cover 3). The cover opening/closing sensor 200 outputs a detection signal (for example, a signal at a high level) having a first value and inputs it to the controller 45 (see FIG. 5) when the original cover 3 is open, and outputs a detection signal (for example, a signal at a high level) having a second value and inputs it to the controller 45 when the original cover 3 is closed. Hereby, the controller 45 receives the detection signal output from the cover opening/closing sensor and can detect that the original cover is lifted or that the original cover is closed based upon a value of the detection signal.

The cover opening/closing sensor 200 is a photocoupler provided with a luminous element that emits a beam and a light receiving element that receives a beam from the luminous element and inputs a signal according to the intensity of the beam to the controller 45. In this case, a protrusion not shown that intercepts light from the luminous element to the light receiving element when the cover 3 is closed (that is, the cover 3 covers the surface 9) is provided to the original cover 3. When the original cover 3 is lifted, the light receiving element of the photocoupler receives a beam of predetermined intensity from the luminous element, inputs a detection signal according to the intensity to the controller 45, and the controller 45 can detect that the original cover 3 is opened owing to this configuration. As the intensity of a beam which the light receiving element receives from the luminous element becomes weaker (for example, zero) than the predetermined intensity and accordingly, a value of the detection signal varies when the original cover 3 is closed, the controller 45 can detect that the original cover 3 is closed.

As described above, the controller 45 judges both whether the original cover 3 is closed or not and whether it is opened or not based upon the detection signal from the cover opening/closing sensor and releases the power saving mode during the power saving mode when either of that the original cover 3 is closed or that it is opened is detected. Besides, the controller 45 turns the power mode to the power saving mode when a predetermined event (for example, the finish of reading operation) such as the original cover 3 is closed is not sensed and fixed time elapses after it is sensed that the original cover 3 is lifted and the power saving mode is released and releases the power saving mode again when the power saving mode is turned on and it is sensed that the original cover 3 is closed. Concretely, the controller 45 instructs the timer to start operation when a state at that time is equivalent to at least one of following (1) to (3) and turns the power mode to the power saving mode when no reading operation is executed, no opening/closing of the original cover is detected and fixed time elapses (when any of those is detected, the timer is reset and restarted):

(1) when the power saving mode is released;
(2) when reading operation is finished in a state except the power saving mode; and
(3) when it is detected that the original cover 3 is closed or that it is opened in a state except the power saving mode.

The fourth transformed example has been described above. According to this transformed example, if it is detected that the original cover 3 is closed in case the power saving mode is turned on in a state in which the original cover 3 is open, the power saving mode is released. That is, as a sign that a user is going to start image reading operation is detected and preparation for reading is started, time required for reading an image can be reduced as a whole.

In the fourth transformed example, the cover opening/closing sensor 200 is not limited to the photocoupler and may be also another device, for example a device described in following (1) or (2):

(1) a button pressed when the original cover is closed and restored when the original cover is opened; and (2) an external light sensor that detects external light incident on the surface of the original table or inside the body from the outside of the body and outputs a detection signal.

In case the cover opening/closing sensor 200 is the button described in (1), the button may be also mounted in a predetermined location outside an area of the surface 9 and covered with the original cover 3 on the surface of the original table (or may be also provided to a location not on the original table but on the original cover 3 overlapped with the predetermined location). The predetermined location may be also a far location from the center of the surface 9 in distance from the pivotal portion of the original table and the original cover 3 and may be also the pivotal portion of the original table and the original cover 3 or its vicinity as shown in FIG. 15.

In case the cover opening/closing sensor 200 is the external light sensor described in (2), the sensor 200 may be also mounted in the body 10 and may be also mounted on the outside surface of the body 10. That is, a location in which the external light sensor is mounted may be also any location in which the sensed intensity of external light decreases when the original cover 3 is closed in a state in which it is open and in which the sensed intensity of external light increases when the original cover 3 is opened in a state in which it is closed. For example, the external light sensor may be also mounted in the pivotal portion of the original table and the original cover 3 or its vicinity and may be also mounted in a far location from the center of the surface in distance from the pivotal portion of the original table and the original cover 3.

The preferred embodiment and the transformed examples of the invention have been described, however, these are example for the explanation of the invention and do not limit a scope of the invention only to this embodiment and the transformed examples. The invention can be also embodied in other various modes. For example, the controller 45 may also judge whether the power saving mode is to be released or not based upon whether the amount of the increase or the decrease of the following output signal value exceeds predetermined variation or not in place of or in addition to judging whether the power saving mode is to be released or not based upon whether an output signal value (that is, the intensity of external light sensed by the external light sensor 100) from the external light sensor 100 is smaller than the predetermined threshold or exceeds it (in other words, the controller may also judge whether the original cover 3 is opened or closed or whether an original in predetermined size is put on the surface 9 or is removed). Besides, a method of coupling the original cover 3 to the original table so that the original cover can be opened is not limited to the method of using the turning shaft 13 and various methods such as a method of using a hinge can be adopted.

What is claimed is:

1. A system having a power saving mode comprising:
   a body provided with an original table having a surface for putting an original;
   an original cover coupled to the original table so that the original cover can be opened and closed to cover at least the surface of the original table;
   a light source that emits a beam;
   a power source that supplies power to the light source;
   an external light detector that detects external light incident on the body via the surface and outputs a detection signal;
   a judging unit that judges whether a value of intensity of the external light is changed from a value being smaller than a threshold value to a value being larger than the threshold value and whether the value of the intensity of the external light is changed from a value being larger than the threshold value to a value being smaller than the threshold value, the threshold value being a value between a value of the intensity of the external light in a state that the original having a predetermined size is put on the original table and a value of the intensity of the external light in a state that the original is not put on the original table; and
   a power source controller that controls the power source so that the power saving mode is released, if the judging unit judges that the value of the intensity of the external light is changed from the value being larger than the threshold value to the value being smaller than the threshold value, when the intensity of the external light is unchanged in a predetermined time and the power saving mode is turned on, and that controls the power source so that the power saving mode is maintained, if the judging unit judges that the value of the intensity of the external light is unchanged from the value being smaller than the threshold value to the value being larger than the threshold value, when the intensity of the external light increases and a state of the original cover is changed.

2. The system according to claim 1, wherein in the power saving mode, the power source controller stops the supply of power to the light source or reduces power supplied to the light source than that in a normal mode.

3. The system according to claim 1, wherein the light source is at least one of a fluorescent lamp, a xenon lamp and a light emitting diode.

4. The system according to claim 1, further comprising an image output device that outputs read image data of an original.

5. The system according to claim 4, wherein
   the image output device is provided with a normal power mode and a power saving mode,
   power is supplied to the image output device from the power source, and
   when the cover opening/closing detector is at least detected that the original cover is closed, the power source controller releases the power saving mode if the image output device is in the power saving mode.

6. The system according to claim 4, wherein the read image output device includes at least one of following (1) to (4):
   (1) an image data transmitter that transmits read image data to a device connected to the system so that communication is possible;
   (2) a facsimile transmitter that transmits read image data to a predetermined or user-desired destination terminal via a public telephone network by a facsimile signal;
   (3) a data storage that stores read image data in an external storage connected to the system so that the external storage can be detached; and
   (4) a printer that prints read image data on a predetermined print medium.

7. The system according to claim 1, wherein the power source controller judges both whether the intensity of external light increases or not and whether the intensity decreases or not based upon the detection signal and releases the power saving mode when it is judged at least either of that the intensity of the external light increases or that the intensity of the external light decreases respectively in the power saving mode.

8. The system according to claim 1, wherein in case judgment is made so that external light is unchanged even if predetermined time elapses after the power saving mode is released based upon a detection signal, the power saving mode is turned on.

9. The system according to claim 1, wherein the threshold value is a value smaller than a value of the intensity of the external light in a state that another original having a smaller size than the predetermined size is put on the original table and larger than a value of the intensity of the external light in a state that the original having the predetermined size is put on the original table.

10. A method of controlling a power source of a system having a power saving mode, the system comprising a body having an original table having a surface for putting an original, an original cover coupled to the original table so that the original cover can be opened and closed to cover at least the surface of the original table, a light source and the power source that supplies power to the light source, the method comprising:

detecting external light incident inside the body via the surface and outputting a detection signal;

judging whether a value of intensity of the external light is changed from a value being smaller than a threshold value to a value being larger than the threshold value and whether the value of the intensity of the external light is changed from a value being larger than the threshold value to a value being smaller than the threshold value, the threshold value being a value between a value of the intensity of the external light in a state that the original having a predetermined size is put on the original table and a value of the intensity of the external light in a state that the original is not put on the original table;

controlling the power source so that the power saving mode is released, if said judging indicates that the value of the intensity of the external light is changed from the value being larger than the threshold value to the value being smaller than the threshold value, when the intensity of the external light is unchanged in a predetermined time and the power saving mode is turned on; and controlling the power source so that the power saving mode is maintained, if said judging indicates that the value of the intensity of the external light is unchanged from the value being smaller than the threshold value to the value being larger than the threshold value, when the intensity of the external light increases and a state of the original cover is changed.

* * * * *